United States Patent [19]

Haddock

[11] Patent Number: 4,820,913
[45] Date of Patent: Apr. 11, 1989

[54] MULTIPLE CARD RECORDING SYSTEM
[75] Inventor: Richard Haddock, Redwood City, Calif.
[73] Assignee: Drexler Technology Corporation, Moutain View, Calif.
[21] Appl. No.: 937,648
[22] Filed: Dec. 2, 1986
[51] Int. Cl.[4] .......................... G06K 1/18; G06K 13/08
[52] U.S. Cl. ..................................... 235/487; 235/454; 235/486; 235/475; 346/76 L; 346/138; 369/84
[58] Field of Search ............... 235/380, 436, 438, 454, 235/449, 474, 475, 479, 486, 487, 488, 476; 346/76 L, 138; 365/234; 360/2, 15, 87, 100, 136; 369/34, 36, 37, 39, 84, 179, 178, 192; 250/566–570; 283/904, 85, 86, 94; 354/4

[56] References Cited
U.S. PATENT DOCUMENTS

| | | | |
|---|---|---|---|
| 3,512,130 | 5/1970 | Hulett | 235/380 |
| 3,654,624 | 4/1972 | Becker et al. | 365/234 |
| 3,949,191 | 4/1976 | Crowther et al. | 235/380 |
| 4,074,282 | 2/1978 | Balas et al. | 346/138 |
| 4,084,198 | 4/1978 | Lemelson | 235/449 |
| 4,241,405 | 12/1980 | Allocca | 360/100 |
| 4,260,998 | 4/1981 | Fukui | 346/138 |
| 4,360,728 | 11/1982 | Drexler | 235/462 |
| 4,390,176 | 6/1983 | Kato | 346/138 |
| 4,578,717 | 3/1986 | Lemelson | 360/2 |
| 4,592,042 | 5/1986 | Lemelson | 235/486 |
| 4,672,182 | 6/1987 | Hirokawa | 235/380 |
| 4,684,228 | 8/1987 | Holthusen | 354/4 |

Primary Examiner—Alan Faber
Assistant Examiner—Robert A. Weinhardt
Attorney, Agent, or Firm—Thomas Schneck

[57] ABSTRACT

A data card recording system having a rotatable drum for supporting a plurality of data cards on its circumferential surface. A laser light source emits a beam which is modulated in response to data and directed to the cards on the rotating drum. The beam produces data spots in a plurality of parallel tracks aligned in the direction of drum rotation. The focussing optics may be moved transversely to record in adjacent tracks. A data segment accessed from a data source and stored in a register of a microprocessor is recorded on a track on each card on the drum. A data control, controlling modulation rate, and a position detector unit are provided to synchronize the light beam modulation with the drum rotation rate. Drums and optical system embodiments are described for both reflectively and transmissively read data cards.

12 Claims, 4 Drawing Sheets

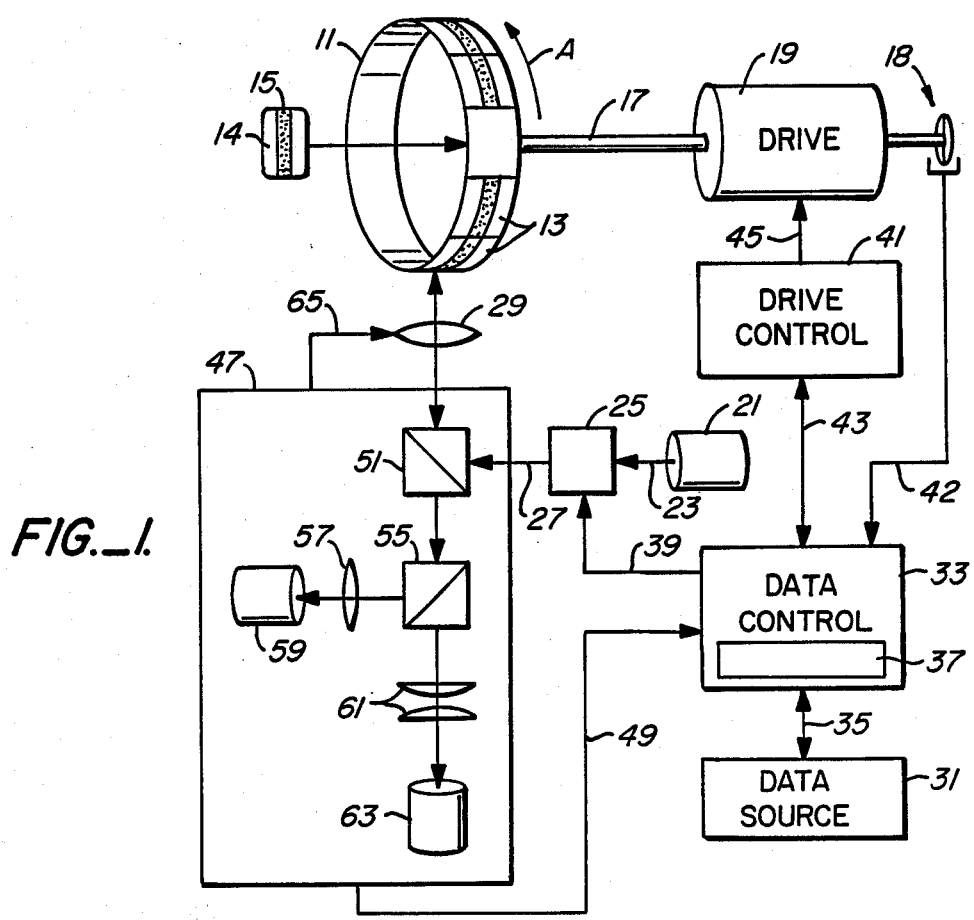
FIG._1.
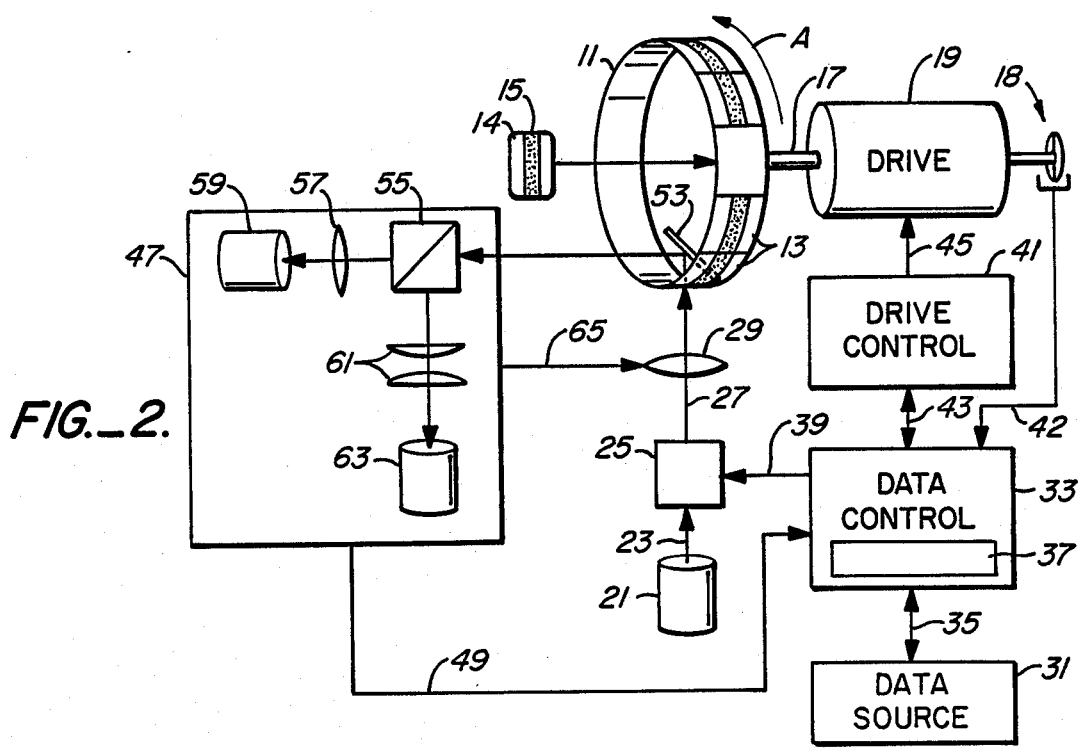
FIG._2.

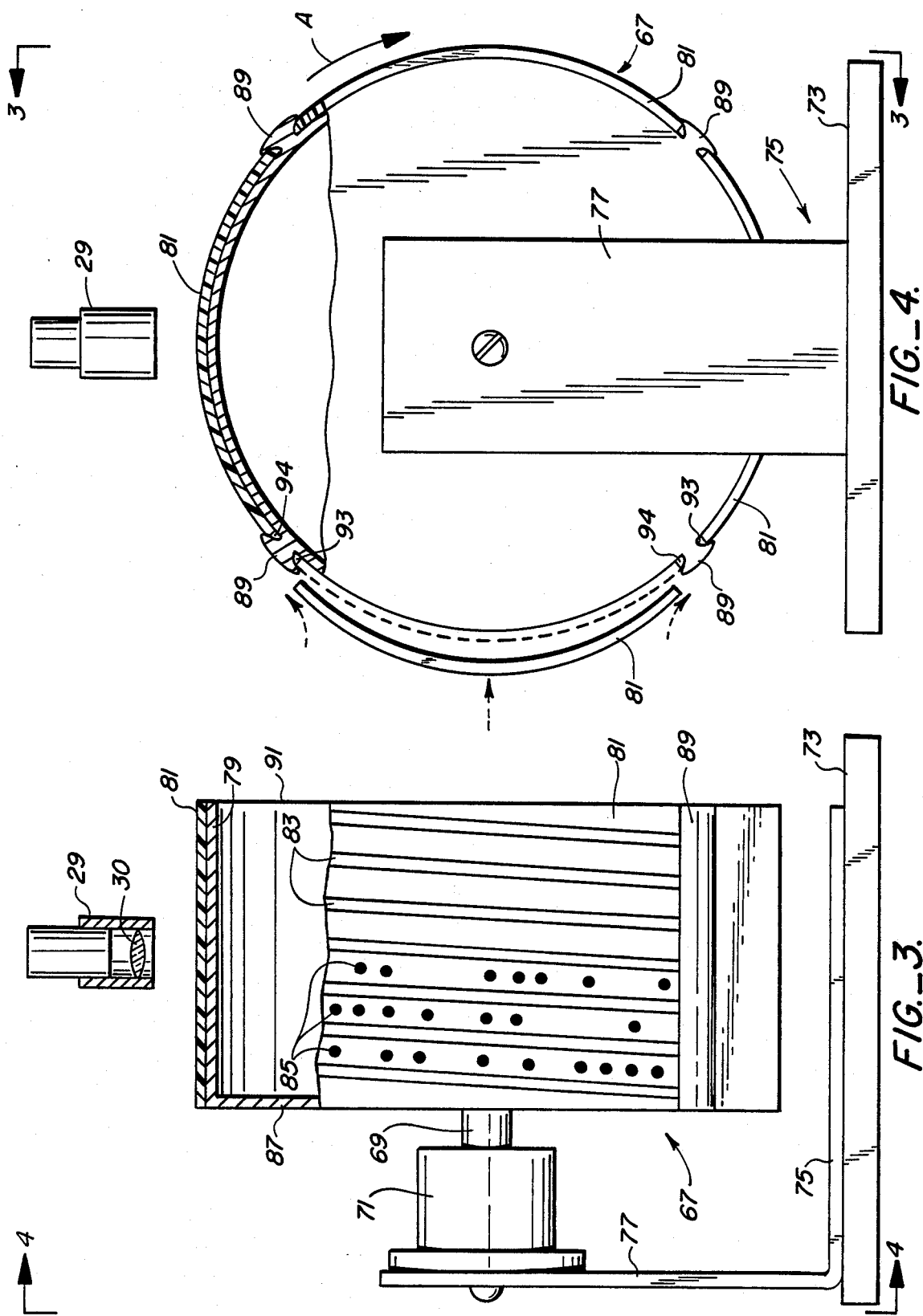

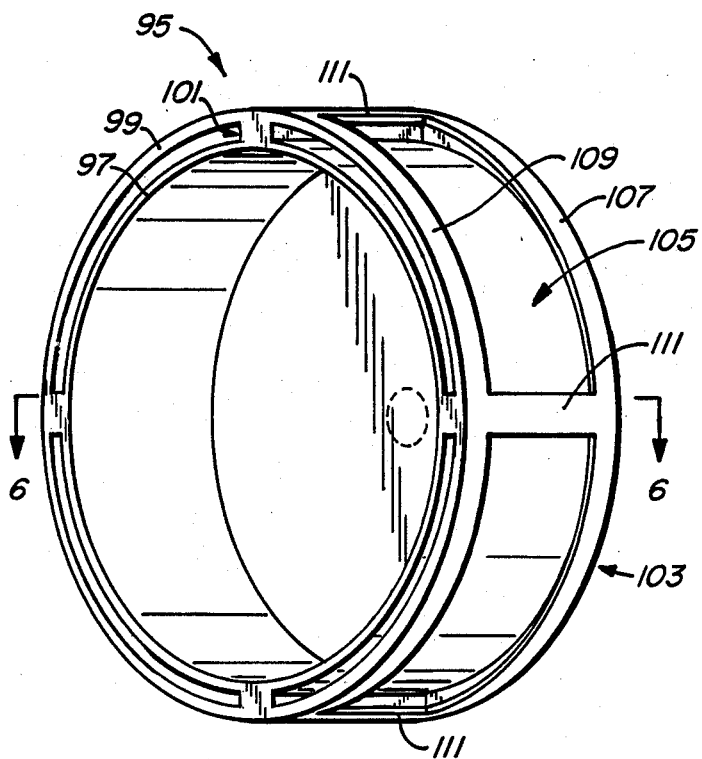
FIG._5.
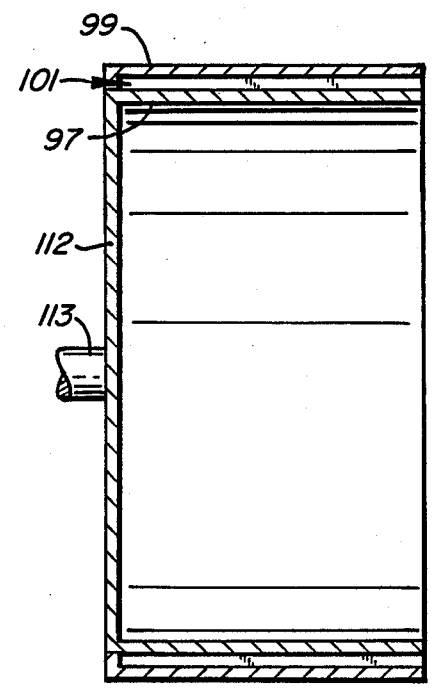
FIG._6.
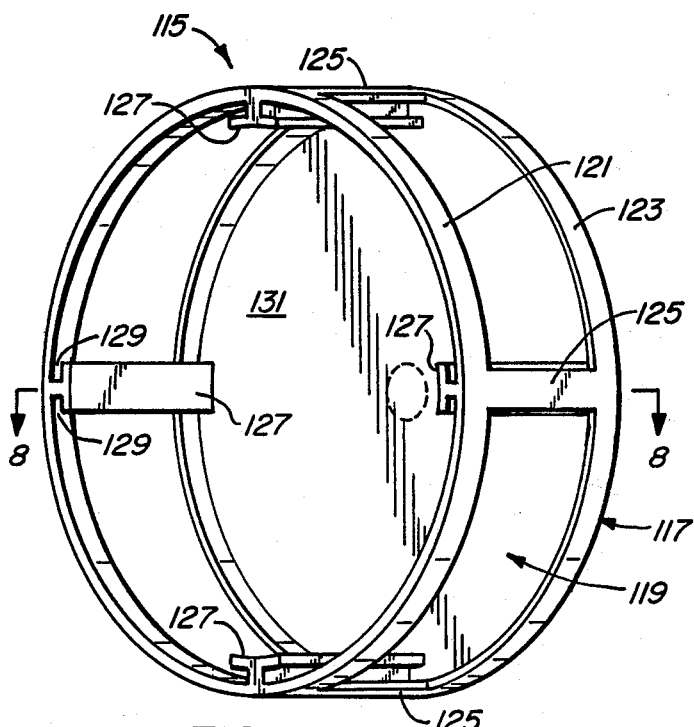
FIG._7.
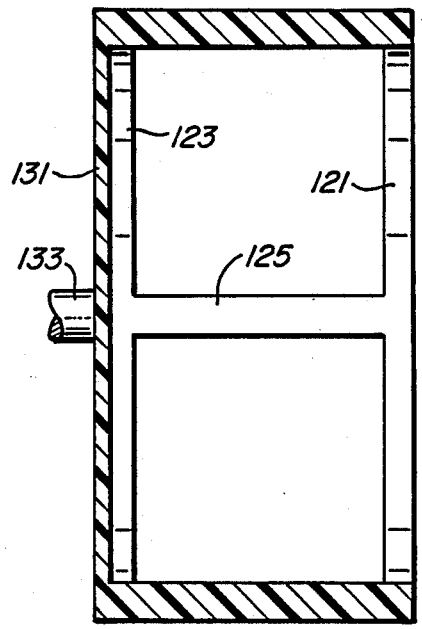
FIG._8.

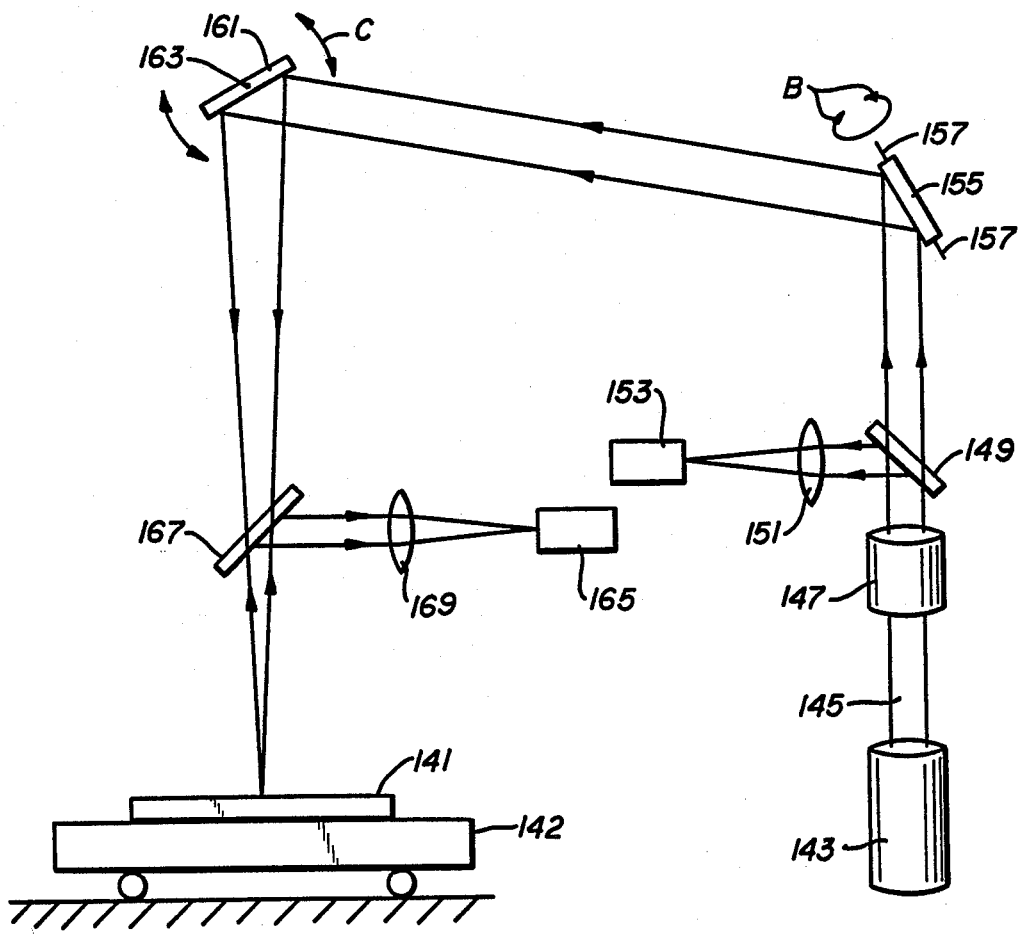
FIG._9.

MULTIPLE CARD RECORDING SYSTEM

DESCRIPTION

1. Technical Field

The present invention relates to optical data storage and in particular to systems for recording optical data on cards.

2. Background Art

In U.S. Pat. No. 4,360,728, Drexler discloses a data card writing and reading system in which a laser light source emits a beam directed to a card. A first servo controlled mirror is mounted for rotation in order to find the lateral edges of laser recording material on the card in a coarse mode of operation and then in a fine mode of operation identify data paths which exist predetermined distances from the edges. A second servo controlled mirror is mounted for rotation in order to scan the beam in a fine mode of operation along the length of the card. Coarse control of the lengthwise position of the card is achieved by motion of a movable holder supporting the card. When recording, the beam produces light scattering pits representing the data bits in the laser recording material. The data are read by a photodetector detecting differences in reflectivity between a pit and surrounding material using a reduced power laser beam.

In U.S. Pat. No. 3,654,624, Becker et al. disclose a laser recording system in which a flat elongated record strip is wound around the surface of a drum. The drum is rotated with respect to the laser beam during recording and reproducing operations. By means of a servo-controlled linear positioning mechanism, the laser beam is moved transversely to the direction of drum rotation to permit selection of any one of a large number of spaced parallel scan lines on the record strip.

In an application of card duplicating such as for on-demand publishing, there is a need to record from about ten to a few thousand data cards, all containing the same information. A typical card writer/reader has a recording speed of about 10,000 data spots per second. Thus, it would require about 30 minutes to fill a single card with 2 megabytes of data. Although lasers are capable of generating pulses at a rate of 200,000 per second, the overall recording speed is reduced by the continuous accelerations and decelerations involved in card motion relative to a fixed laser, or vice versa. The need to synchronize the laser beam pulses with the speed and position of the card also reduces the recording speed.

An object of the present invention is to produce a high speed data card recording system which is capable of handling the high volume demands of electronic publishing, card duplicating and the like.

DISCLOSURE OF THE INVENTION

The above object has been met with a data card recording system which records identical data on each of a plurality of data cards supported around the circumferential surface of a drum. The drum is mounted for rotation and may have flanges set in the circumference for gripping the longitudinal ends of the cards. Alternatively, the drum may comprise a pair of concentric cylinders in which the cards are mounted between the cylinders. A light source emits a light beam which is directed along an optical path to the cards. The drum may be transmissive to the light beam or have openings or transmissive windows where the card is mounted on the inside rather than on the outside of the drum. The system also includes a data control circuit in communication with a data source and having at least one memory location for storing a data segment to be recorded onto the data cards. A modulator electrically connected to the data control circuit and positioned in the optical path modulates the light beam in response to the data segment. Each of the cards has a strip of laser recordable optical data storage material disposed thereon, so that as the drum rotates, the modulated beam produces data spots corresponding to the stored data segment in one of a plurality of parallel tracks on each of the data cards on the drum.

Tracks of data are aligned in the direction of drum rotation. The relative transverse position between the beam and the cards is movable, as by moving an element in the beam path, so that additional data segments may be recorded in multiple parallel tracks on each of the cards. The data control circuit in communication with a drive control drives the light beam modulation at a rate which is synchronized to the drum speed. Recording is complete when the data cards are each filled with identical information or when all data segments have been recorded. A photodetector may be positioned for reading a track on a card, measuring changes in optical contrast defined by data spots formed on the track, and thereby verify that data recording is accurate. The same or another photodetector may provide autofocus control of the light beam. The same or still another photodetector may provide servo tracking of the light beam.

BRIEF DESCRIPTION OF THE DRAWINGS

FIG. 1 is a schematic view of a data card recording system for reflective cards.

FIG. 2 is a schematic view of a data card recording system for transmissive cards.

FIG. 3 is a side plane of a first embodiment of a drum for the systems in FIGS. 1 and 2.

FIG. 4 is an end view taken along the lines 4—4 in FIG. 3.

FIG. 5 is a perspective view of a second embodiment of a drum for the systems in FIGS. 1 and 2.

FIG. 6 is a side sectional view of the drum of FIG. 5 taken along the lines 6—6 in FIG. 5.

FIG. 7 is a perspective view of third embodiment of a drum for the systems in FIGS. 1 and 2.

FIG. 8 is a side sectional view of the drum of FIG. 7 taken along the lines 8—8 in FIG. 7.

FIG. 9 is a side plan view of an optical card reader for use with the systems in FIGS. 1 and 2.

BEST MODE FOR CARRYING OUT THE INVENTION

With reference to FIGS. 1 and 2, a data card recording system includes a rotatable drum 11 supporting a plurality of data cards 13 bent around the drum circumferential surface. Each data card comprises a card base 14 and a strip 15 of laser recordable optical storage material disposed on base 14. Data cards are typically wallet sized with a width dimension of approximately 54 mm and a length dimension of approximately 85 mm. These dimensions are not critical, but preferred because such a size easily fits into a wallet and has been adopted as a conventional size for automatic teller machines and the like. For cards of these dimensions, an 11 inch (27.9 cm) diameter drum is capable of supporting 10 cards, as shown in FIG. 1. Smaller drums, such as the drums in FIGS. 3–8 with a diameter of approximately 5 inches (12.7 cm), support as few as four cards, while larger diameter drums will support more than 10 cards.

Card base 14 is a dielectric, usually a plastic material, such as polycarbonate, polyvinylchloride or similar material. Alternatively, card base 14 may be a metal film. Card base 14 may be either opaque or transparent. Card base 14 must be transparent when used with strips 15 which are transmissively read. Strip 15 is typically about 10 mm to 54 mm wide and extends the length of the card. The strip may be applied by any convenient method which achieves flatness and adherence to the card base. A transparent protective laminating sheet made of polycarbonate plastic or other material may cover strip 15 to protect it from dust and scratches.

The laser recordable optical data storage material which forms strip 15 may be one of the reflective recording materials which have been developed having direct-read-after-write capability. Typical recording media are described in U.S. Pat. Nos.4,314,260, 4,278,758, 4,278,756, 4,298,684, 4,269,917 and 4,284,716, all assigned to the assignee of the present invention. These media contain suspensions of reflective metal particles in organic colloids and form highly reflective low melting temperature laser recordable media. Data are recorded by forming reduce reflectivity spots which contrast with the surrounding field of the reflective layer itself. Reflectivity of the strip field of about 50% with a reflectivity of a spot in the field of less than 10% is preferred, thus creating a contrast ratio of at least five to one, although a contrast ratio of two to one or even lower is sufficient for reading the data. Alternatively, media which have reflective spots in a low reflectivity field may be used. Media which are read by light transmission through the card may also be used. Erasable materials, such as magneto-optic and amorphous-to-crystalline recording materials, may also be used.

Drum 11 is rotatable about a drive shaft 17 on the drum cylindrical axis, as indicated by arrow A. A motor 19 to which drive shaft 17 is connected provides rotary power for turning drum 11. Typically, drum 11 rotates at a speed from about 150 to 1800 rpm. A position encoder 18 measures the speed of rotation and also indicates the completion of each drum rotation. A laser 21 emits a laser light beam 23 directed along an optical path to card 13 mounted on drum 11. A modulator 25 positioned in the optical path modulates the light beam 23 in response to data. The resulting modulated beam 27 is focussed onto an optical data storage strip 15 of a card 13 on the drum 11 by means of focussing optics 29. For a semiconductor laser, current modulation may be used.

As the data cards 13 carried on surface of the rotating drum 11 move past the focussed beam, data spots are recorded by the beam in one of a plurality of parallel tracks on each of the cards. The tracks are aligned in the direction of drum rotation along the length of the card. Additional tracks are recorded by moving the relative lateral position between the beam and the cards on the drum. This may be accomplished by moving the focussing optics 29 so as to move its optical axis laterally or change the orientation of its optic axis, thereby redirecting in either case the light beam's optical path slightly. Alternatively, a servo-controlled mirror, as described in U.S. Pat. No. 4,360,728, assigned to the assignee of the present invention, may be used. Also, the lateral position of drum 11 may be changed by altering the length of shaft 17 between drum 11 and motor 19 with a solenoid. Alternatively, a stepper motor may be used. The focussing beam should deliver sufficient laser pulse energy to the surface of the recording material to create spots. Typically, 10-40 milliwatts is required, depending on the recording material. A 40 milliwatt semiconductor laser, focussed to a five micron beam size, records at temperatures of about 200 C and is capable of creating spots in less than 5 microseconds. The wavelength of the laser 21 should be compatible with the recording material.

A data source 31 is connected to a data control circuit 33 via a data bus 35. Data source 31 may be semiconductor memory internal to the card writing system or may be an external peripheral device such as an optical card reader, disk drive or keyboard. When data source 31 is an optical card reader the entire system could be called a card duplicator. Data control circuit 33 is typically a microprocessor and includes at least one data register 37 for storing a data segment read from data source 31. Data control circuit 33 produces as output an electrical signal corresponding to the data segment stored in register 37 which is transmitted along a line 39 to modulator 25 so as to modulate laser light beam 23 in response to the data segment. The electrical signal output is produced as many times as there are data cards 13 on drum 11 for the same data segment so that each card records identical information. The length of a data segment is preferably equal to the amount of data necessary to record one complete track on a data card. After a track of data has been recorded on each data card 13 on drum 11, data control circuit 33 produces an electrical signal output corresponding to another data segment for recording on an adjacent rack on each card. Preferably, data control circuit 33 has a second data register like register 37 to read and store the next data segment while the signals for the current data segment are being output. Data control 33 receives via bus 42 a synchronizing signal from position encoder 18 after each drum revolution. Data control 33 may then send a signal via bus 49 to reposition unit 47 to the next track. Recording continues until all data in data source 31 are recorded or until data cards 13 are filled.

Data control circuit 33 also communicates with a drive control or servo 41 via a bus 43. Drive control 41 sends electrical signals along a line 45 to motor 19 to cause motor 19 to start, stop, speed up or slow down Together data control circuit 33 and drive control 41 synchronize the light beam modulation with the rotary speed of the drum. Alternatively, the rotation speed is sensed using position encoder 18. This signal is used by data control 33 to synchronize the modulation rate of modulator 25 with the rotation speed of drum 11.

A detector unit 47 may be disposed in reading relation relative to a track for providing feedback to data control circuit 33 and drive control 41. Detector unit 47 communicates with these control elements 33 and 41 via an electric signal line 49. In FIG. 1, data cards 13 are read by reflection, so that detector unit 47 is positioned in a light reflective relation relative to cards 13 on drum 11. A beamsplitter 51 may be used to direct modulated beam 27 to cards 13 and to direct reflected light from cards 13 to one or more detectors 59 and 63. In FIG. 2, data cards 13 are read by light transmission, so that detector unit 47 is positioned in a light transmissive relation relative to cards 13. A mirror 53 inside drum 11 may be used to direct transmitted light from cards 13 to one or more detectors 59 and 63.

In the two-detector unit 47 shown in FIGS. 1 and 2, a second beamsplitter 55 directs a portion of the light from cards 13 through a focussing lens 57 onto a reading detector 59, and a second portion through a lens doublet 61 onto an autofocus detector 63. Typically 50% of the light is direted to reading detector 59 and 50% of the light is directed to autofocus detector 63. Other detector arrangements may also be used. Autofocus detector 63 communicates with focussing optics 29 via bus 65 to effect a change in either the focal length of focussing optics 29 or the distance between focussing optics 29 and a card 13 on drum 11, thereby bringing the modulated beam 27 into a sharp focus onto card 13. Reading detector 59 reads data as or just after data are written by sensing changes in optical contrast defined by data spots formed on a track of the card so as to verify proper data recording. Detector 59 may also be used to read prererecorded clocking marks, beginning and end of track marks and other track codes to aid in the synchronization of data writing. Prerecorded marks may not be necessary in precision high speed recorders.

In the case of a precision high speed recorder it is desirable that the recording beam move smoothly in the absence of track guides rather than in steps. In this case the beam can be moved in a uniform manner in a helical scan by means of a precision screw. So that the laser recorded data are parallel to the card edge, it is preferable that the card be mounted in a skew fashion and each card be offset from the next. The degree of skew and offset would be determined by the data track pitch.

With reference to FIGS. 3 and 4, a drum 67 is rotatably mounted on a shaft 69 and driven by a motor 71. The drum may be mounted for rotation about either a horizontal or vertical axis. A base 73 supports a frame 75 which has an upright arm 77 to which motor 71 is mounted. The drum depicted has a circumferential surface 79 sufficiently large to accommodate four wallet size data cards 81 that are 85 mm long. As noted above, larger drums which can accommodate a greater number of data cards may also be used and are similarly constructed. Focussing optics 29 having at least one lens 30 are located outside of drum 79 for focussing a modulated light beam for writing data spots 85 onto cards 81. Focussing optics 29 may also direct reflected light from cards 81 to a detector unit 47, shown in FIG. 1. Servo track guides 83 may be provided on cards 81 for feedback and motor control in reading and writing the spots 85 in tracks between the track guides. Track guides 83 are aligned in the direction of travel of the rotating drum, indicated by arrow A. Servo track guides 83 may not be necessary in precision high speed recorders. Alternatively, track guides and other indicia may be written with the laser as the data are being written on cards which have no prerecorded indicia.

Drum 67 comprises a circumferential surface or cylinder 79 and a circular side wall 87 connected to one edge of cylinder 79. A plurality of transverse flanges 89 are spaced around the circumference of the drum for support and retention of the data cards. Motor shaft 69 may be directly mounted to side wall 87, as shown in FIG. 3, or alternatively may be offset and the drum driven by means of a connecting pulley and drive shaft mounted to either side wall 87 or a disk in rim 91 opposite from side wall 87. Data cards 30 are fastened to the outer circumferential surface 79 of the drum by means of grooves 93 and 94 in the sides of transverse flanges 89. The data cards 81 are somewhat flexible and may be bent, as shown in phantom in FIG. 4, so as to slide into grooves 93 and 94 of flanges 89.

In FIGS. 5 and 6, an alternate embodiment of a drum 95 comprises two concentric cylinders 97 and 99 having a card retention slot 101 between the two cylinders 97 and 99. A plurality of data cards may be mounted in slot 101. The outer cylinder 99 is transmissive to the modulated laser light beam used for recording on the cards and may either be formed of transmissive plastic or comprise a metal frame structure 103 with transmissive windows 105. The windows 105 may either consist of open areas in the frame 103 or be formed or transmissive plastic, glass of other material set in the frame. Likewise, the inner cylinder 97 may be formed of transmissive material or comprise a frame with transmissive windows. The inner cylinder need not be transmissive to the recording light beam when using reflectively read data cards, and may be formed from a solid opaque material, such as metal. When used to support transmissively read cards in the configuration shown in FIG. 2, both the outer and inner cylinders must be transmissive.

Frame 103 of outer cylinder 99 has a pair of rings 107 and 109 joined by means of struts 111. Struts 111 may extend inward to inner cylinder 97 thereby providing transverse barriers in slot 101 to keep cards from slipping. A solid base 112 is attached to ring 107 and inner cylinder 97 providing means for mounting motor shaft 113. Slot 101 is open at one edge, opposite from base 112, allowing access into slot 101 for the data cards.

In a third embodiment, shown in FIGS. 7 and 8, a drum 115 comprises a frame 117 having windows 119. Windows 119 may be open areas, as shown, or alternatively, be formed of transmissive material, such as glass or plastic. Frame 117 has a pair of rings 121 and 123 joined by struts 125. Each strut has flanges 127 attached on the inside surface thereto, with grooves 129 in the flanges 127 for retaining data cards. A solid base 131 is attached to one of the rings for mounting a motor shaft 133 to the drum.

In FIG. 9, an optical card reader, which may form the data source 31 in the systems of FIGS. 1 and 2, has a master data card 141 disposed in reading relation thereto. The card 141 is usually received in a movable holder 142 which brings the card into the read beam trajectory. A light source 143, such as a semiconductor laser or light emitting diode emits a beam 145, typically of near infrared wavelength, which passes through collimating and focussing optics 147. The beam may be sampled by a beam splitter 149 which transmits a portion of the beam through a focussing lens 151 to a photodetector 153. The detector 153 confirms that the read beam is on and of a constant power level. Power is about 5% of the power needed to record on the card. Detector 153 is optional.

The beam is then directed to a first servo controlled mirror 155 which is mounted for rotation along the axis 157 in the direction indicated by arrows B. The purpose of mirror 155 is, in a coarse mode, to find the lateral edges of the optical data storage material on card 141 and then in a fine mode of operation to identify data paths which exist predetermined distances from the edges. In FIG. 9, the lengthwise dimension of the card 141 is shown. From mirror 155, the beam is directed toward mirror 161. This mirror is mounted for rotation at pivot 163. The purpose of mirror 161 is for fine control of motion of the beam along the length of the card. Coarse control of the lengthwise position of the card relative to the beam is achieved by motion of movable holder 142. The position of the holder may be established by a linear motor adjusted by a closed loop position servo system of the type used in magnetic disk drives. The card may have prerecorded or laser recorded reference position information such as servo tracks and timing marks, as well as program instructions and related functions. These positions marks can be used as a reference for the optical card reader to read data at particular locations. Upon reading one data path, mirror 155 is rotated slightly so that the next data path can be read.

Light scattered and reflected from data spots contrasts with the surrounding field where no spots exist. Optical contrast between a spot and surrounding field is detected by light detector 165 and focussing lens 169. The detector 165 produces electrical signals corresponding to spots. These signals may be sent along bus 35 to data control 33 in FIGS. 1 and 2 for storage of a data segment corresponding to a track of data on master data card 141. Servo motors, not shown, drive the mirrors 155 and 161 in the optical card reader in accord with instructions received from data control 33.

Using any of the drums described in FIGS. 3-8 with systems in FIGS. 1 and 2, one can obtain a high speed data card recording system useful for card duplication such as in on-demand publishing. The system is capable of recording several data cards at once with the same data, at an average speed of two minutes per card. Instead of taking three weeks to record one thousand cards, the job can be completed in less than a day and a half. The use of rotating drums not only enable multicard recording, but also simplifies synchronization of card position with data compared to prior reciprocating systems, resulting in fewer recording errors.

What is claimed is:

1. A data card recording system comprising,
    a rotatably mounted drum having means for gripping a plurality of data cards around the drum circumferential surface in a longitudinally skewed fashion to a direction of drum rotation, each card being offset from a next card by a distance dependent upon a desired track pitch, each of said plurality of data cards having a strip of laser recordable optical data storage material disposed thereon,
    means in communication with a data source for storing a digital data segment,
    a light source emitting a light beam, said beam being directed and focused along an optical path to said plurality of data cards, said beam having a size on said cards of at most five microns,
    means for modulating said light beam in response to said data segment, said beam producing data spots corresponding to said data segment in one of a plurality of parallel tracks on each of said data cards in sequence, one card after another, said tracks being aligned in a direction of drum rotation, and
    means for moving the relative transverse position between said beam and said plurality of data cards, additional data segments being recorded in others of said plurality of parallel tracks on each of said data cards, said means for moving being continuously operable.

2. The system of claim 1 wherein said gripping means comprises flanges set in the circumference of the drum and aligned skewed to the direction of drum rotation, whereby longitudinal ends of said plurality of data cards are retained by pressure of said flanges.

3. The system of claim 2 wherein said plurality of data cards are supported around the outside of said drum circumferential surface.

4. The system of claim 2 wherein said plurality of data cards are supported against the inside of said drum circumferential surface, said drum being transmissive of said light beam.

5. The system of claim 1 wherein said drum comprises two concentric cylinders and said plurality of data cards are mounted between said cylinders, at least the outer one of said cylinder being transmissive of said light beams.

6. The system of claim 1 wherein said drum comprises a pair of spaced apart concentric circular frame members and a plurality of bars therebetween connecting said pair of frame members together.

7. The system of claim 6 wherein windows transmissive of said light beam are provided in at least one of said frame members between said bars.

8. The system of claim 1 further comprising detector means disposed in reading relation relative to a track for sensing changes in optical contrast defined by data spots formed on said track, said laser recordable optical data storage material being direct-read-after-write material.

9. The system of claim 8 wherein said light source and said detector means are in light reflection relation relative to said drum and said data cards.

10. The system of claim 8 wherein said light source and said detector means are in light transmission relation relative to said drum and said data cards.

11. The system of claim 1 further comprising means in communication with said data segment storing means for driving said drum at a rotary speed synchronized to said light beam modulation.

12. A system for duplicating optical data cards comprising,
    a rotatably mounted drum having means for gripping a plurality of data cards around the drum circumferential surface in a longitudinally skewed fashion to a direction of drum rotation, each card being offset from a next card by a distance dependent upon a desired track pitch, each of said plurality of data cards having a strip of laser recordable optical data storage material disposed thereon,
    an optical card reader having a master data card with digital data to be duplicated written thereon in data read relation to said card reader,
    means in communication with said optical card reader for storing a data segment from said master data card,
    a semiconductor laser emitting an infrared laser beam, said beam being directed and focused along an optical path to said plurality of data cards on said drum, said beam having a size on said cards of at most five microns,
    means for modulating said laser beam in response to said data segment, said beam producing data spots corresponding to said data segment in one of a plurality of parallel tracks on each of said data cards in sequence, one card after another, said tracks being aligned at a pitch to the direction of drum rotation, and
    means for moving the relative transverse position between said beam and said plurality of data cards on said drum, additional drum segments from said master data card being recorded in others of said plurality of parallel tracks on each of said data cards on said drum, said means for moving said relative position being continuously operable.

* * * * *

UNITED STATES PATENT AND TRADEMARK OFFICE
CERTIFICATE OF CORRECTION

PATENT NO. : 4,820,913

DATED : April 11, 1989

INVENTOR(S) : Richard Haddock

It is certified that error appears in the above-identified patent and that said Letters Patent is hereby corrected as shown below:

Column 1, line 23, delete the word "the".

Column 3, line 19, "Nos.4,314,260" should read -- Nos. 4,314,260 --.

Column 4, line 31, "rack" should read -- track --.

Column 6, line 8, "formed or" should read -- formed of --.

Column 7, line 3, "positions" should read -- position --.

Claim 5, column 8, line 9, "beams" should read -- beam --.

Signed and Sealed this

Thirteenth Day of November, 1990

Attest:

HARRY F. MANBECK, JR.

*Attesting Officer*  *Commissioner of Patents and Trademarks*